(No Model.)

C. MAHLER.
REED FOR LOOMS.

No. 561,333. Patented June 2, 1896.

WITNESSES:
Duncan M. Robertson
Samuel White

INVENTOR:
Charles Mahler
BY Gartner & Co
ATTORNEYS

UNITED STATES PATENT OFFICE.

CHARLES MAHLER, OF PATERSON, NEW JERSEY.

REED FOR LOOMS.

SPECIFICATION forming part of Letters Patent No. 561,333, dated June 2, 1896.

Application filed February 15, 1896. Serial No. 579,362. (No model.)

*To all whom it may concern:*

Be it known that I, CHARLES MAHLER, a citizen of the United States, residing in Paterson, Passaic county, and State of New Jersey, have invented certain new and useful Improvements in Reeds for Looms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a reed for looms of simple and durable construction and which produces the watering design upon goods during the operation of weaving.

The invention consists in the improved reed, in certain designs arranged upon the faces of said reed and formed by a series of depressions in adjoining teeth, and in the combination and arrangement of the various parts, substantially as will be hereinafter more fully described, and finally embodied in the clauses of the claim.

Figure 1:
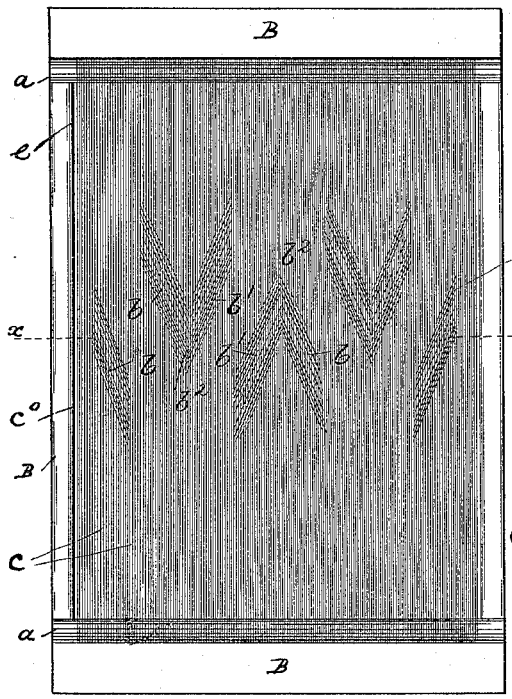
Figure 2:
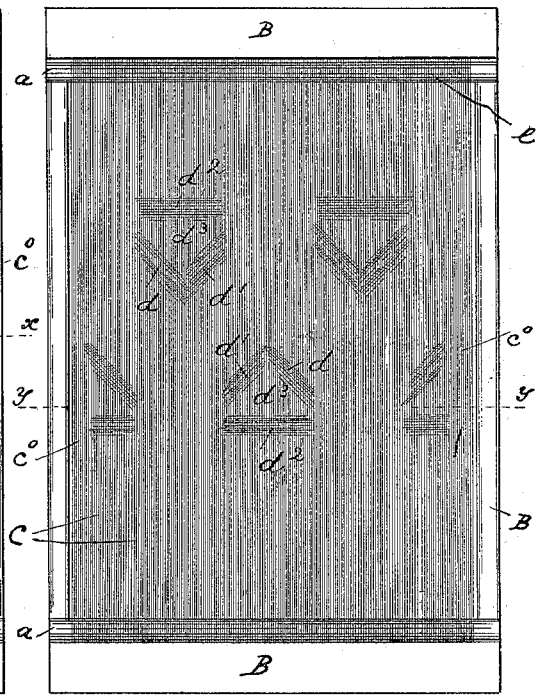
Figure 3:
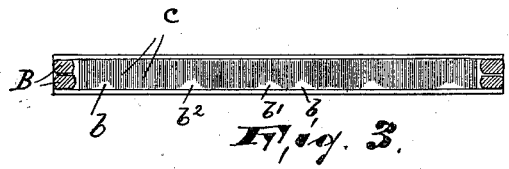
Figure 4:
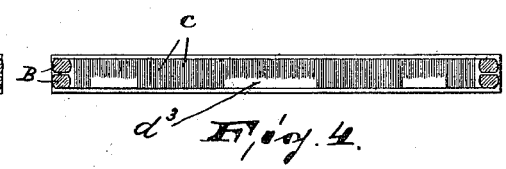
Figure 5:
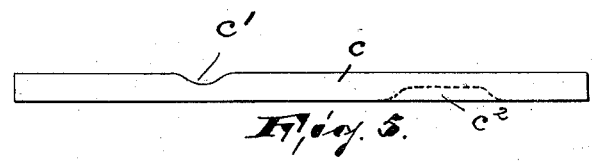

Referring to the accompanying drawings, in which like letters of reference indicate corresponding parts in each of the several views, Figure 1 is a front elevation of my improved reed; Fig. 2, a rear elevation thereof. Figs. 3 and 4 are sectional views on the lines $x\ x$ and $y\ y$ of Figs. 1 and 2, respectively; and Fig. 5, a detail view of one of the teeth forming the design on the face of the reed.

In said drawings, B B represent the frame of the reed, to which are secured the cross-bars $a\ a$, around which is wound the wire $e$, forming a continuous spiral, all as clearly shown and of the usual construction.

Between the bars $a\ a$ and resting between the coils formed by the wires $e$ are arranged the teeth $c^0$, of uniform width, and the teeth $c$, provided with rounded depressions $c'\ c^2$. The said depressions are arranged in said teeth at various distances from the cross-bars $a$, and thus form, as in Fig. 1, a series of depressed curved channels $b$ and $b'$, connecting at the point $b^2$, or, as in Fig. 2, a series of depressed planes $d^3$, having the sides $d, d'$, and $d^2$. The channels or depressions thus obtained form and correspond to the watering designs to be produced on the fabric.

Heretofore the watering design was produced by a reed having its teeth pivoted at their lower ends and having their upper ends operated or pushed outward beyond the face of the reed by a series of pins or heads arranged on a revolving roller.

With my improved reed, which during the operation of weaving is slowly reciprocated in a vertical direction, the weft-threads will conform to the shape of the depressed channels or planes, that is to say, will be slightly curved outward (seen from the front of loom) at the places of said depressions, and thus produce the watering design, as will be manifest.

From the foregoing it can be seen that the watering design and effect upon the fabric depends entirely from the designs upon the faces of the reed made by the depressions in its teeth and that numerous and various designs can be formed on either one or both faces of the reed.

I do not intend to limit myself to the precise construction shown and described, as various alterations can be made without changing the scope of my invention; but

What I claim as new, and desire to secure by Letters Patent, is—

1. A reed consisting of a frame, and of a series of teeth secured in said frame and provided with curved depressions forming a design on the face of the reed, substantially as and for the purposes described.

2. A reed consisting of a frame, and of a series of teeth secured in said frame, a certain number of said teeth being of uniform width, while others adjacent to each other are provided with curved depressions, substantially as and for the purposes described.

3. A reed consisting of a frame, and of a series of teeth secured in said frame, and provided with depressions forming designs on the face of the reed, to correspond to the watering designs to be produced on fabric during the operation of weaving, substantially as described.

In testimony that I claim the foregoing I have hereunto set my hand this 10th day of February, 1896.

CHARLES MAHLER.

Witnesses:
ALFRED GARTNER,
OTTO A. HAENICHEN.